Patented May 14, 1940

2,200,941

UNITED STATES PATENT OFFICE 2,200,941

PROCESS FOR PRODUCING SODIUM ACETYLIDE

Richard Rockhill Vogt, South Bend, Ind., assignor to E. I. du Pont de Nemours & Company, Wilmington, Del., a corporation of Delaware No Drawing. Application November 19, 1938, Serial No. 241,377

10 Claims. (Cl. 260—665)

This invention relates to the preparation of sodium acetylide. More particularly it relates to a new and improved process for preparing sodium acetylide.

Numerous investigators have prepared sodium acetylide by reacting metallic sodium with acetylene in liquid ammonia solution, but universally, when carried out in liquid ammonia, the process has been to dissolve or partially dissolve the sodium and then add acetylene to the solution until the reaction is completed according to the equation $2C_2H_2 + 2Na \rightarrow 2C_2HNa + H_2$, the end point of the reaction generally being indicated by the disappearance of the typical blue color of dissolved sodium. This method of operation has two outstanding disadvantages, (1) the reaction of the sodium is very slow, requiring several hours, and (2) the volume of liquid ammonia required is large and costly owing to the limited solubility of sodium.

It is therefore an object of this invention to provide an improved process for preparing sodium acetylide. A further object is to provide a process by which sodium acetylide is formed more rapidly and economically in liquid ammonia solution of the reactants. A still further object is to provide a process for preparing sodium acetylide in liquid ammonia solution of the reactants which is largely free of the disadvantages of known processes. A more specific object is to provide a process in which the addition of the ingredients to the liquid ammonia solution is controlled. Other objects will appear hereinafter.

It has now been discovered, quite unexpectedly, that these difficulties may be overcome and the objects of the invention attained by reversing the manner of addition of the ingredients of the reaction to the liquid ammonia solution. In other words, the objects of this invention have been accomplished by adding sodium to a liquid ammonia solution of acetylene at such a rate that during a major portion of the reaction no substantial dissolved excess of sodium is present, instead of following the customary process of adding acetylene to a liquid ammonia solution of sodium.

Though it is not intended that the scope of this invention shall be limited to any theoretical considerations, it is believed that the explanation of this unexpected result is not a question of solubility alone. The increase in speed is believed to be due to the fact that the reaction is slowed up in the old processes by the presence of dissolved metallic sodium. Thus, in the process about to be described more fully, an effort is made to prevent the presence of unreacted sodium in the reaction mixture, it being added only as fast as it is consumed. It has been found that if an excess of sodium is added accidentally, the reaction is slowed up tremendously and does not regain its original velocity until the excess sodium has been consumed.

The following examples which more fully illustrate the process are given for the purpose of illustration alone, and, accordingly, they are not intended to be construed as limiting the scope of the invention:

Example 1

A suitable vessel, having a volume of approximately 0.5 l. per mole of acetylide to be prepared, is equipped with a cooling jacket capable of refrigeration to a temperature below the boiling point of liquid ammonia at atmospheric pressure (for example —40 to —50° C.). It is also equipped with a vigorous mechanical agitator, an acetylene inlet reaching to a point near the bottom of the vessel, a gas outlet, and a mechanical device for slowly lowering pigs of solid sodium into the pot. A suitable mechanical device for this purpose may be a stainless steel wire on which the sodium pig is tied, leading out of the vessel thru a stuffing box to a reel, in such a manner that the weight of the sodium causes it to slowly lower into the pot as the wire is unwound from the reel.

The vessel is approximately half filled with liquid ammonia afer cooling to a suitable temperature, agitation is started, and acetylene is passed in at a rate sufficiently rapid that it is not completely dissolved. When the ammonia is saturated with acetylene, without stopping agitation or acetylene addition, a clean pig of sodium is connected to the mechanical lowering device and slowly lowered into the ammonia solution as rapidly as consumed. The rate of sodium introduction is adjusted so that the blue color of unreacted sodium is apparent only in the immediate zone of contact. Vigorous agitation should be maintained, and the introduction of acetylene should be rapid enough to maintain a saturated solution. In the event that the addition of sodium has been too rapid and the solution becomes blue in color, sodium should be withdrawn until the blue color has disappeared.

In the manner of this example, a quantity of sodium acetylide can be prepared in 15 to 30 minutes, using a smaller volume of liquid ammonia, and, therefore, smaller equipment, which would require several hours by the prior methods.

Example 2

Three volumes of liquid ammonia is placed in a steel autoclave equivalent to 10 volumes, and saturated with acetylene by bubbling the gas thru the ammonia at a rapid rate for two minutes. In a separate container a solution of sodium in 3 volumes of liquid ammonia is prepared which contains 100 gms. of sodium per liter. The sodium solution is added to the acetylene solution while the latter is vigorously stirred, controlling the rate of addition so that the entire mixture never becomes blue. If a slight excess of sodium is inadvertently added, the solution is allowed to clear up completely and is then treated with acetylene for one minute before continuation of the additions of the metal solution. Ammonia is added as necessary to maintain the volume of the mixture. Solid sodium acetylide may be obtained by evaporation of the ammonia if desired, or it may be used in the ammonia solution as prepared.

As has been indicated above, the invention is not limited to the exact method of operation set forth in the above examples. Thus, it will be obvious that, if desired, liquid ammonia may be added during the reaction to replace any lost by evaporation. Moreover, instead of applying external cooling the liquid ammonia may be allowed to evaporate slowly from the solution in order to provide refrigeration. Means may also be provided for recovery of liquid ammonia, hydrogen, and excess acetylene during the reaction, though this is not an essential feature of the invention. Loss of ammonia and acetylene can be largely avoided thru the use of suitable refrigeration. When formed, the acetylide may be used in the liquid ammonia solution or suspension or, if desired, it may be isolated by evaporation of the ammonia.

The temperature of the reaction is not critical. With a decrease in temperature, the solubility of acetylene in liquid ammonia is increased at normal pressure, therefore the reaction is faster than at higher temperature and the same pressure. However, this may be compensated for by the application of pressure at the higher temperature. The preferred temperature range for simplicity in operation is $-35°$ to $-60°$ C.; if temperatures above $-35°$ C. are used, it is essential to apply sufficient pressure to overcome the vapor pressure of the liquid ammonia. The preferred operating pressure is atmospheric or slightly above, thus minimizing the necessary pressure controls and the need for suitable venting device to allow hydrogen to escape without excessive loss of ammonia. However, the only pressure limitation is the safe handling pressure for acetylene under the conditions of operation.

As was pointed out in explaining the theory regarding the effect of the controlled addition of sodium to an ammonia solution of acetylene, it is not intended that the present invention shall be to any extent limited by any purely theoretical considerations. It may be pointed out, however, that it is believed that the reason that temperatures well below the boiling point of ammonia at atmospheric pressures are particularly desirable is because under these conditions the solubility of the sodium acetylide is decreased to the point where the sodium still dissolves in the solution saturated with sodium acetylide. At $-34°$ C. sodium appears not to be soluble in solutions saturated with sodium acetylide. At $-50°$ C. or $-60°$ C. the sodium acetylide separates and more sodium may be dissolved. Thus, if desired, it is also possible at these temperatures to decant liquid ammonia.

Any suitable means of adding sodium to the ammonia solution of acetylene may be applied, but it is very desirable to have the ammonia solution of acetylene in a state of vigorous agitation during the addition of the sodium if best results are to be obtained. A mechanical method of lowering the sodium such as the one described is particularly convenient in small scale operation. However, when the quantity of acetylene solution is large, the sodium may be added by directly introducing small pieces or pigs of the metal. In this case, the evolution of hydrogen tends to float the metal and limit its rate of solution sufficiently that an excess, as indicated by the blue coloration, can be avoided by careful addition and control of the size of the pieces of metallic sodium added. Another convenient method of adding the sodium has been illustrated in Example 2, in which sodium as well as acetylene, was dissolved in liquid ammonia and the solution of the metal added to the solution of acetylene at a controlled rate to accomplish the objects of this invention. Still another alternative is to control the addition of the sodium by means of a photoelectric cell actuated by change in color of the solution from colorless to blue and so arranged that sodium is withdrawn upon appearance of the blue color. Such a cell might be used, for example, in connection with a windlass such as that described in Example 1 for mechanically lowering a pig of sodium into the reaction mixture. The essential feature of the invention is the addition of metallic sodium to the liquid ammonia solution of acetylene, but the invention is not limited to any specific manner of mechanically handling the ingredients.

In the first example, approximately 0.5 l. of reactor volume was half filled with liquid ammonia per mole of acetylide prepared. These quantity relations are not fixed. Obviously, the reactor may be larger, or even slightly smaller, though it is desirable to have a free space to allow vigorous agitation and free escapement of the evolved hydrogen. In the example, 0.25 l. of liquid ammonia was used per mole of acetylide formed. Obviously, the volume of liquid ammonia may be increased at will to any ratio desired. The volume recited, though not the limiting minimum, is approximately the minimum ratio of ammonia to acetylide which can be conveniently handled. The quantity of sodium to be added is limited only by the size of the reactor in a batch process although under any condition the rate of addition of sodium must be controlled to avoid an excess of dissolved sodium in the reaction medium.

As pointed out in Example 2, the sodium acetylide may or may not be isolated from the ammonia as desired. When isolation is to be effected it may be brought about in any desired manner as, for example, by evaporation.

Where the process is made continuous for example, by circulating ammonia in a system in which acetylene is added, preferably to saturation, and sodium is then added only about as rapidly as it reacts according to the method outlined above, the suspension of sodium acetylide may then be circulated to a settling chamber where the liquid ammonia is decanted off and returned to the reaction chamber. The solid sodium acetylide may then be obtained from the concentrated sludge in the settling chamber either in the form of a concentrated suspension, or in the pure state by evaporating off the residual ammonia which may also then be reused.

It will be obvious from the above that a new and substantially improved process for producing sodium acetylide has been described. The new process is much more rapid than previously described processes and, in addition, avoids the necessity for employing large volumes of ammonia. The process is easily carried out and readily controlled.

It is apparent that many widely different embodiments of this invention may be made without departing from the spirit and scope thereof and, therefore, it is not intended to be limited except as indicated in the appended claims.

I claim:

1. The process for producing sodium acetylide which comprises adding sodium to a liquid ammonia solution of acetylene at such a rate that during a major portion of the reaction no substantial dissolved excess of sodium is present.

2. The process for producing sodium acetylide which comprises adding sodium to a liquid ammonia solution of acetylene at a rate which does not materially exceed the rate at which the sodium reacts.

3. The process of claim 1, further characterized in that the ammonia solution of acetylene is maintained in a state of vigorous agitation during the addition of the sodium.

4. The process of claim 1, further characterized in that the reaction is carried out at a temperature of —35° C. to —60° C.

5. The process of claim 1, further characterized in that the reaction is carried out at a temperature of —35° C. to —60° C. and in that the ammonia solution of acetylene is maintained in a state of vigorous agitation during the addition of the sodium.

6. The process of claim 1, further characterized in that the reaction is carried out at a temperature of —50° C. to —60° C.

7. The process of claim 1, further characterized in that the reaction is carried out at a temperature of —50° C. to —60° C. and in that the ammonia solution of acetylene is maintained in a state of vigorous agitation during the addition of the sodium.

8. The process of claim 1, further characterized in that the sodium is added by lowering a pig of solid sodium into the ammonia solution of acetylene and in that the solution is maintained in a state of vigorous agitation during the addition of the sodium.

9. The process of claim 1, further characterized in that the sodium is added in the form of a solution in liquid ammonia and in that the solution is maintained in a state of vigorous agitation during the addition of the sodium.

10. The process which comprises lowering a pig of solid sodium into a liquid ammonia solution of acetylene maintained in a saturated state by the introduction of additional acetylene and maintained in a state of vigorous agitation at a temperature of —40° C. to —50° C., the sodium being added as rapidly as consumed with the blue color of dissolved sodium being apparent only in the immediate zone of contact.

RICHARD R. VOGT.